Figure 29:
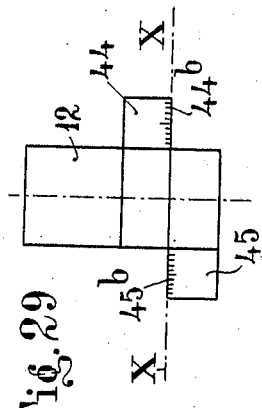

V. COLZI & F. BARDELLI.
TELEMETER.
APPLICATION FILED OCT. 11, 1909.
1,058,556.
Patented Apr. 8, 1913.
6 SHEETS—SHEET 1.
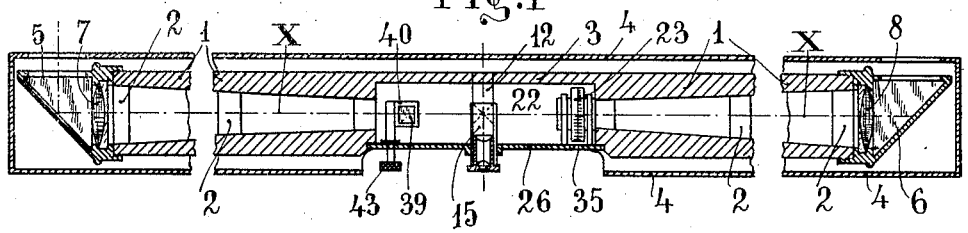
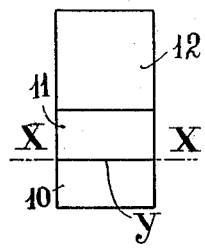 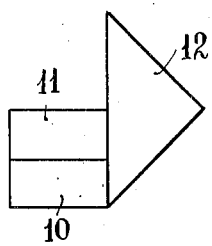 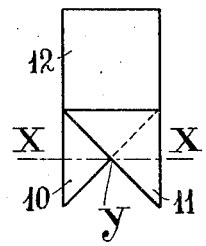 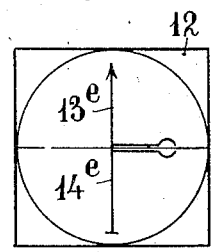
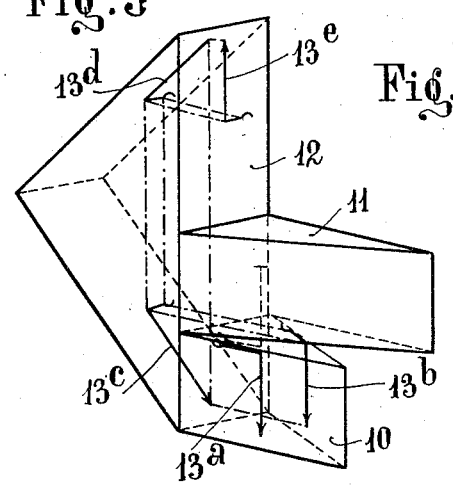 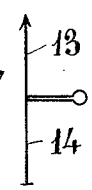 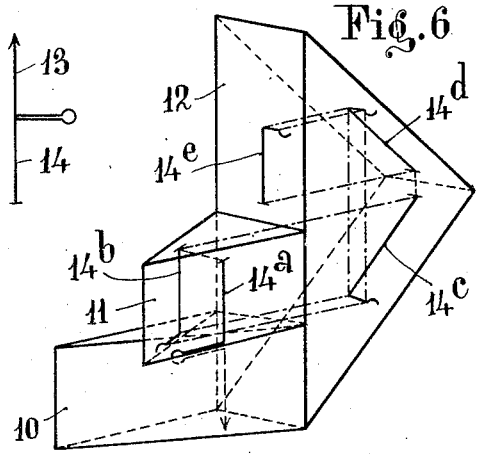
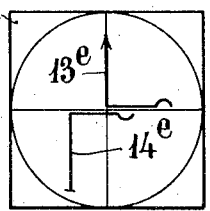

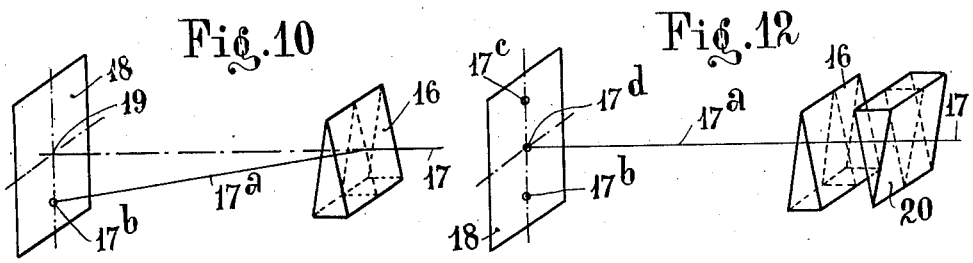
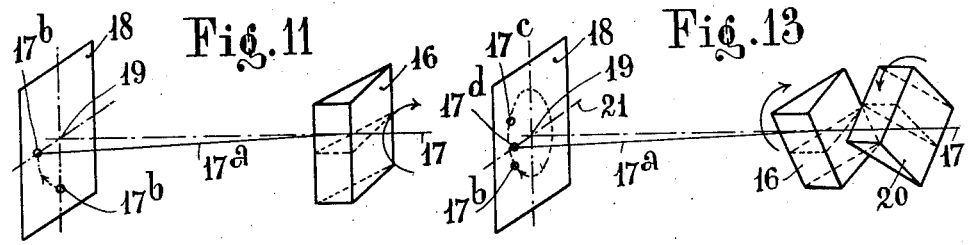
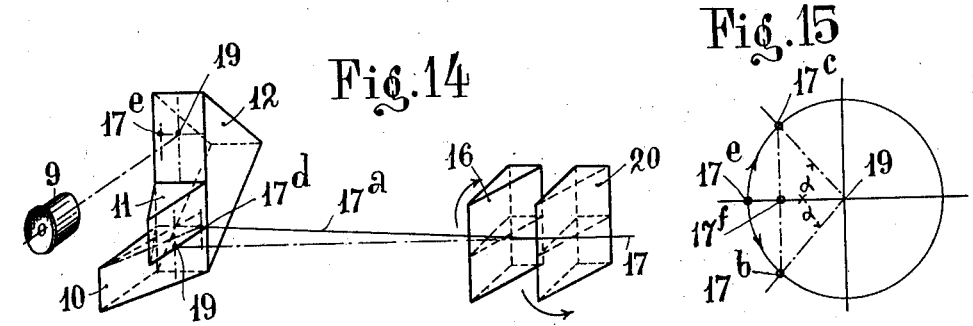
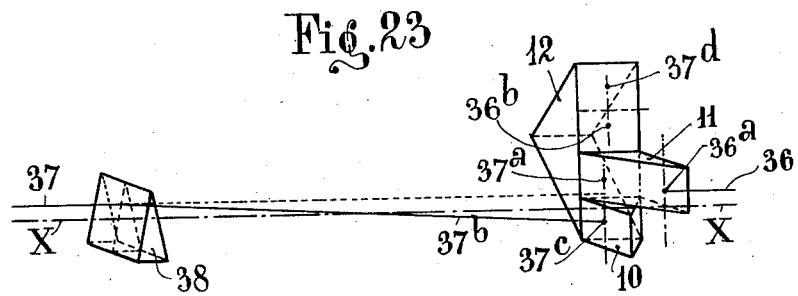
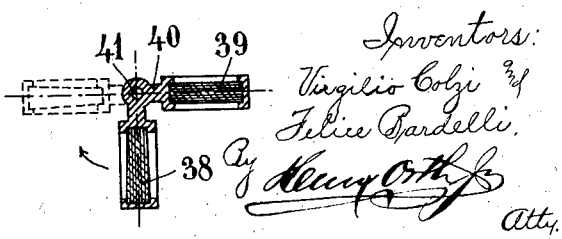

V. COLZI & F. BARDELLI.
TELEMETER.
APPLICATION FILED OCT. 11, 1909.
1,058,556.
Patented Apr. 8, 1913.
6 SHEETS—SHEET 3.
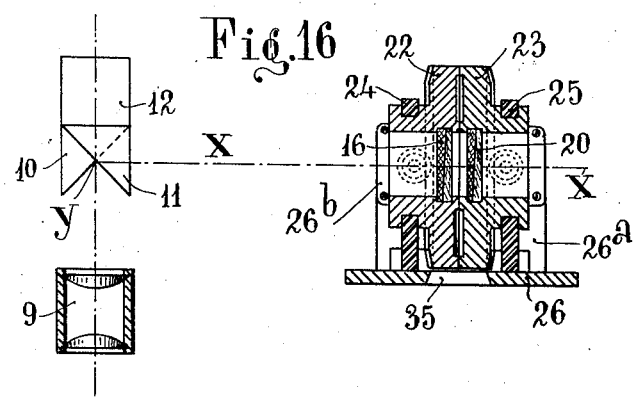
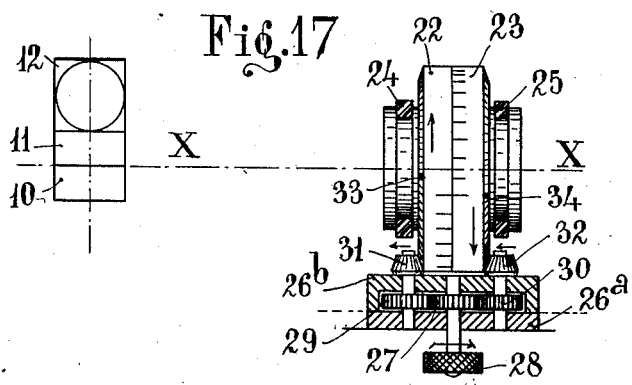
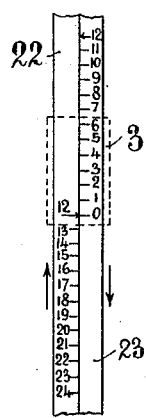
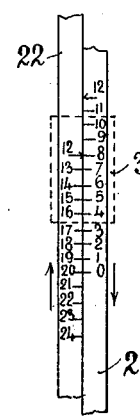
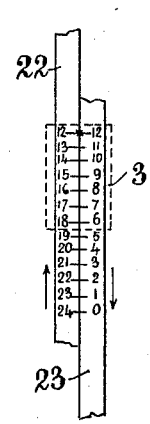
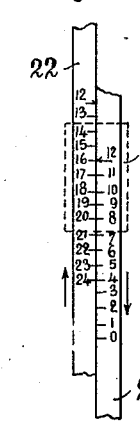
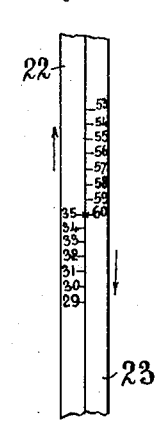
Witnesses:
Inventors
Virgilio Colzi &
Felice Bardelli
By Henry Orth Jr.
Atty.

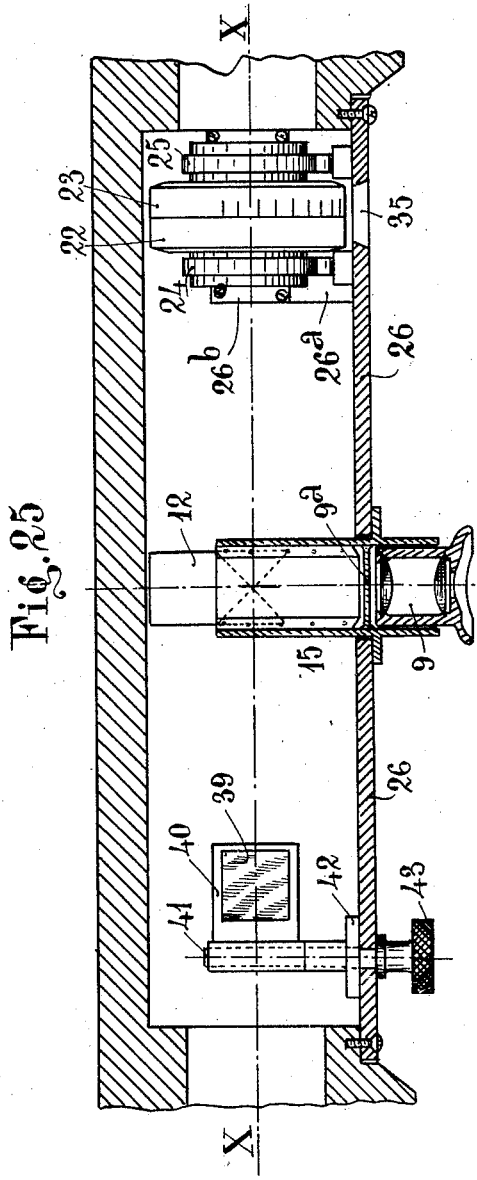
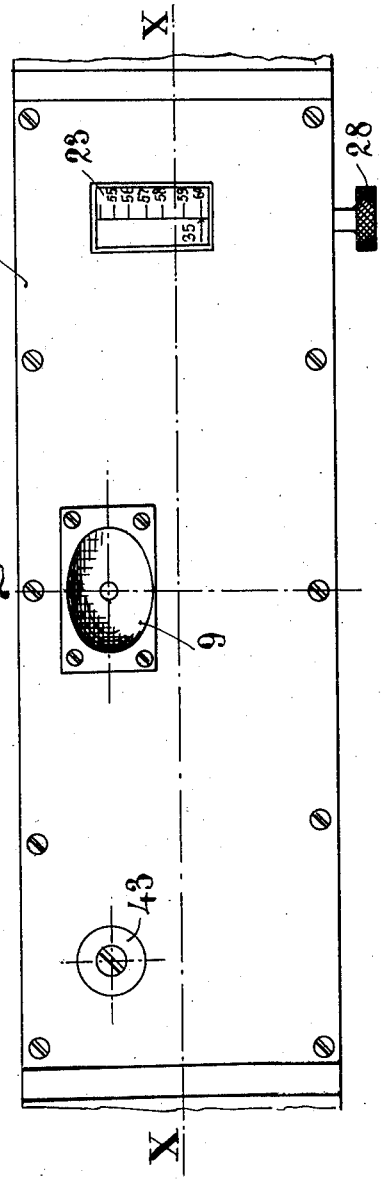

V. COLZI & F. BARDELLI.
TELEMETER.
APPLICATION FILED OCT. 11, 1909.

1,058,556.

Patented Apr. 8, 1913.
6 SHEETS—SHEET 5.

Witnesses
Inventors
Virgilio Colzi
Felice Bardelli

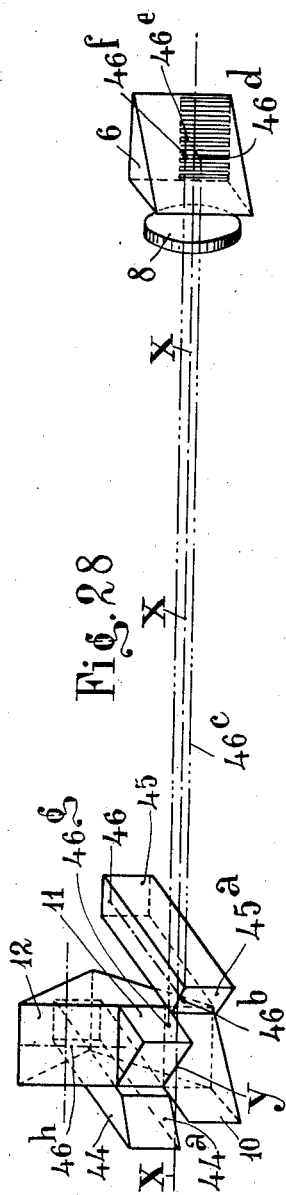

UNITED STATES PATENT OFFICE.

VIRGILIO COLZI AND FELICE BARDELLI, OF TURIN, ITALY.

TELEMETER.

1,058,556.　　Specification of Letters Patent.　　Patented Apr. 8, 1913.

Application filed October 11, 1909. Serial No. 522,123.

*To all whom it may concern:*

Be it known that we, VIRGILIO COLZI and FELICE BARDELLI, both subjects of the King of Italy, residing at 18 Via Roma, Turin, Italy, have invented certain new and useful Improvements in Telemeters; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention refers to a fixed base telemeter by means of which the distance of a distant object clearly visible to the operator may be instantly determined by a single observation at one station.

This present telemeter comprises, a telescopic system, an optical arrangement for measuring distances and a rectifying arrangement.

The telescopic system comprises two prism telescopes, the objective prisms of which are arranged at an invariable distance apart and constitute the telescope base. These telescopes give by means of a system of erecting prisms two distinct images of the object observed, said images being observed in the upper half and in the lower half respectively of the field of a single ocular. The optical arrangement for measuring the distance between the two images thus observed in the two halves of the ocular field, render it possible to deduce from said distance, which is so much the greater the nearer observed object, the distance of the object observed. This measuring arrangement which has for its purpose to cause the two distinct images observed to coincide with one another or with a mark or line of the ocular cross hairs will be hereinafter described. The telemeter also comprises an arrangement for rectifying the position of the objective prisms with regard to the system of erecting prisms and the ocular. This rectifying system, essentially optical, makes it possible to replace the telemeter elements quickly in their first position in which they were during the first marking or graduation of the instrument. It permits therefore the elimination of all the inconveniences arising from the derangements that the instrument may undergo owing to changes of temperature.

Figure 27:
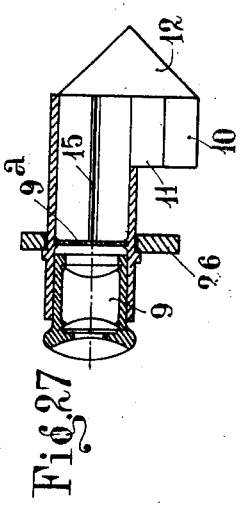
Figure 32:
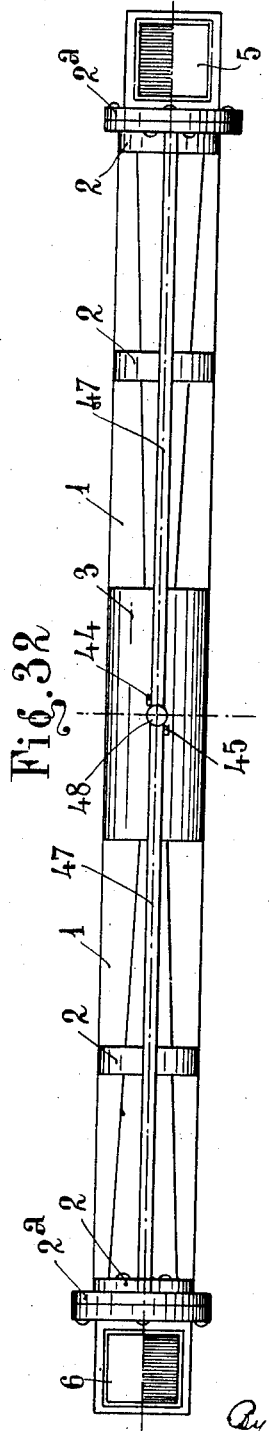
Figure 34:
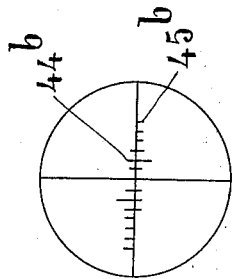
Figure 33:
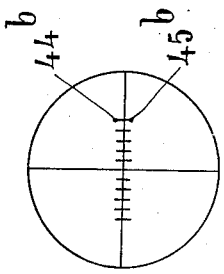

A form of construction of said improved telemeter is shown by way of example in the annexed drawing, in which:

Figure 1 shows diagrammatically a longitudinal section of a telemeter, Figs. 2, 3, 4, 5, 6, show in front view, side view, plan view and two perspective views respectively the system of erecting prisms, Figs. 7, 8, 9, show respectively an object and its images observed in the telemeter during two different conditions of observation, Figs. 10 to 15 are diagrammatic illustrations of the theoretical principle of the micrometer, or measuring device, Figs. 16, 17, are a horizontal section and an elevation respectively of a constructional form of said micrometer, Figs. 18–22 show various positions of the micrometer scales, Fig. 23 is a diagrammatic view illustrating the effect produced by an additional deviating prism used in combination with this telemeter, Fig. 24 is a section of a constructional form of said deviating prism and its mounting, Figs. 25, 26, are a longitudinal section and an elevation respectively of the central part of the telemeter, Fig. 27 shows in a vertical section the eyepiece and the system of erecting prisms, Fig. 28 is a perspective diagram of the theoretical principle of the rectifying arrangement, Fig. 29 is a back view of the system of erecting prisms and additional rectifying prisms, Figs. 30, 31, 32, show in longitudinal section, back view and front view, respectively, the body of the telemeter with the rectifying arrangement, Figs. 33, 34, show the ocular field after and before the rectification of the instrument.

*Telescopic system.*—The telescopic system is inclosed in a casing, preferably of metal having a small coefficient of expansion and constituted by two (Figs. 30 to 32) or more (as in Fig. 1) flanged bars 1 of T-shape or U-shape in section projecting from the opposite sides of a central body portion or block 3 and connected to each other at suitable distances by means of the rings 2. The intermediate rings may serve to mount the instrument on a suitable support which is supported in its turn by a foot of any desired form, while the end rings receive the casings of the prism objectives. The height of the flanged bars 1, the right section of which is preferably T- or U-shaped, diminishes by degrees toward their outer ends at the objectives for the purpose of obtaining approximately a body of uniform resistance to the deflection. The telemeter body is finally protected by an outer case or tube 4 of any suitable material, which is intended to assure uniformity of temperature in the air surrounding the telemeter body and this for the purpose of preventing any unequal expansion of the latter.

At each end of the telemeter body is mounted a light receiver comprising a lens and a prism 5 and 7, and 6 and 8 respectively that make a total reflection, that is each prism has for its base the hypotenuse of an isosceles rectangular triangle. Said prisms 5, 6, the distance between which constitutes the telemeter base, reflect the rays entering through one side and coming out through the other at right angles to their original direction, through the objective lenses 7 and 8 proximate the emergent faces of the prisms. The luminous rays reaching the center of the block 3 are collected by a system of erecting prisms that direct them to the ocular 9.

The system of erecting prisms comprises two total reflecting prisms 10, 11, crossing each other and attached by means of one of their sides on the lower half of the hypotenuse of a third and larger total reflecting prism 12 (Figs. 2 to 6). This prism system is mounted in the central part of the block 3, so that the free sides of prisms 10 and 11 are perpendicular to the axis X—X, of the instrument (Figs. 1, 2) and that the point Y, Fig. 4, which is common to the hypotenuses or bases of the two prisms 10 and 11 will be on the axis X—X. The position of the whole system 10, 11 and 12 is finally determined by the condition, that the hypotenuse of the prism 12 is parallel with the incident faces of prisms 5 and 6. The optical axis of the ocular 9 is then perpendicular to the hypotenuse of the prism 12 and passes through the center of the free upper part of said hypotenuse (Figs. 1 and 25 to 27). Owing to the arrangement above referred to, the free side of each prism 10, 11 is struck by one half only of the rays coming from each objective 7 and 8 respectively.

By observing any object whatever, for instance that 13, 14 of Fig. 7, the inverted image of it produced by the lens 7 and then inverted as will be later described by the prism 5 will be viewed, as shown partly in full lines and partly in dotted lines at Fig. 5, on the free incident face of prism 10. Owing to the limited height of this free face, only the upper part 13$^a$ (shown in full lines) of the image will be included in the free face of the prism 10. This image successively reflected at 13$^b$, 13$^c$, 13$^d$ to the hypotenuse of 10 and on the sides of 12 will be produced erected at 13$^e$ on the upper part of the free portion of the emergent face of prism 12. In a similar manner the inverted image of the object 13, 14, produced by lens 8 and then inverted by the prism 6, will be viewed, as shown partly in full lines and partly in dotted lines at Fig. 6, on the free incident face of the prism 11. Owing to the height and position of said face, only a part, in this case the lower part 14$^a$ (shown in full lines) of the image will be included in said face. This image successively reflected in 14$^b$, 14$^c$, 14$^d$ will be viewed erected in 14$^e$ on the lower part of the free portion of the emergent face of the prism 12. Therefore when the images given by the two objectives 7, 8, are produced on the same focal plane and this latter coincides with that of the ocular 9 in which is placed the cross hairs 9$^a$ (Figs. 25, 27), the image 13$^e$, 14$^e$ of the object 13, 14, will be seen exactly reconstructed in the ocular field (Fig. 8) though its upper part 13$^e$ be due to the objective 7 and the lower one 14$^e$ to the objective 8. It must be noted here that in order to observe clearly in the ocular field the exact reconstruction of the image 13$^e$, 14$^e$, a very thin plate 15 must be arranged horizontally outside the ocular (Figs. 1, 25, 27) said plate containing the optical axis of the ocular and projecting from this latter as far as the free emergent face of prism 12 that it divides into two equal portions. It must, however, be noted that the exact reconstruction of the two images 13$^e$, 14$^e$ into a single image, as shown at Fig. 8, takes place only when—the position of the prisms 5, 6, being ascertained—the observed object is at a given distance. In any other case the images 13$^e$, 14$^e$ produced by the two objectives constitute a broken image as shown at Fig. 9, namely, if the image 13$^e$ is brought to coincide with the vertical wire of the cross hairs, the image 14$^e$ will be driven away by a certain amount, in a direct ratio with the displacement of the prisms 5, 6, (telemeter base) and in inverse ratio with the distance of the object observed. Thus by measuring either directly or indirectly the distance of the images 13$^e$, 14$^e$, the distance of the object observed may be deduced. It is known that the indirect measurement of said distance in this type of telemeter, is effected by producing the displacement of the two parts of the broken image observed in the ocular field, until a single image corresponding to the object observed is produced. This is obtained either by displacing one of the prisms 5, 6, or by arranging in the path of the rays coming from one or the other or both the objectives 7, 8, some device capable of producing a suitable deviation of the rays to produce the reconstructed image. The distance of the object is of course deduced from the displacement given to one of the prisms 5 or 6, or from the constants of the deviating device inserted on the path of the luminous rays.

*Measuring arrangement.*—In the present telemeter we employ for the purpose of measurement, a special arrangement capable of producing a suitable deviation of the luminous rays coming from one of the objectives, which arrangement is based on the following principle: It is known that a prism as 16, Fig. 10, bends a luminous ray 17 (which is supposed to be contained in a principal section of the prism, that is in a plane perpendicular to its refracting edge) in the direction $17^a$ (contained in the plane of the same main section) so that the refracted ray strikes a screen 18 at a point $17^b$ different from the intersection point 19 between the projection of said ray 17 and the screen 18. If the prism 17 is rotated for instance in the direction of the arrow of the Fig. 11 around an axis perpendicular to the bisecting plane of the refracting angle, the refracted or deviated ray $17^a$ will also be rotated in the same direction and to the same degree and if the screen 18 is parallel with said bisecting plane the intersection point $17^b$ will make an arc of a circle the center of which is the point 19. If at the side of the prism 16 there is arranged another identical prism 20 with the bisecting plane of its refractory angle parallel to the bisecting plane of the refracting angle of prism 16 and with its refracting edge 180° to the refracting edge of 16 (Fig. 12), the refracted ray owing to the prism 20 will intersect the plane 18 at $17^c$, while owing to prism 16, it will intersect the plane 18 at $17^b$. Owing to the two deviations in reverse directions to which the ray 17 has been subjected while passing through the prisms 20, 16, the double refracted ray $17^a$ has the same direction as the initial ray 17 and the intersection $17^d$ with 18 will be at the center of the segment $17^a$, $17^c$. In other words in this case the two prisms 16, 20, operate, as is evident, as a glass having plane, parallel faces. If the prisms 16, 20, are now rotated at the same extent and in opposed directions, as shown at Fig. 13, the intersection point $17^d$ is displaced along the line 21 which is the intersection of the screen 18 with the bisecting plane of the compensating angles formed by the planes of the main section of prisms 20, 16 in which are the rays 17 and $17^a$ respectively, said plane being always in an unvariable position in space owing to the equal and opposite rotations imparted to the prisms 20, 16. It is evident that the intersection $17^a$ falls in a point of the line 21, in fact owing to the rotation of prism 20 the refracted ray would meet the screen 18 at $17^c$ while by effect of the rotation of the prism 16, said refracted ray would fall at $17^b$, so that owing to the two equal and opposite rotations of the prisms 16, 20 the refracted ray will intersect the screen 18 at the point $17^d$ which is the center of the segment $17^b$, $17^c$, perpendicular to the line 21.

From the above it will be understood how the system of two prisms just described is used in order to produce the deviation of the luminous rays forming one or the other of the parts $13^e$, $14^e$ of the broken image observed in the ocular field of the telemeter (Fig. 9) in order to reconstruct the same in a single image. For this purpose the two prisms 16, 20, are mounted, for instance, in the path of the rays coming from the objective 8 and in such a way that the bisecting planes of their refracting angles (angles of the prisms) are perpendicular to the optical axis X—X of the telemeter (Fig. 14). Under normal conditions the refracting edges of the two prisms are on the same side and both parallel with the emergent face of prism 12 (Fig. 14). In these conditions the two prisms coöperate to bend in the same direction the ray 17 which refracted at $17^a$ will intersect at $17^b$ the incident face of prism 11 instead of at the central point 19, which is the intersection of the projection of ray 17 with the incident face of 11. The ray $17^a$ entering $17^d$ will come out at $17^e$ from the emergent face of the prism 12 and in the ocular field 9 the image $17^e$ (Fig. 15) corresponding to this ray will be seen at the left end of the horizontal diameter of the field. By rotating in opposite directions the prisms 16, 20, through the same angle, the image $17^e$ is displaced by the rotation of 16 toward $17^b$ (Fig. 15) and by the rotation of 20 toward $17^c$; the definitive image, owing to the simultaneous and opposite rotation of prisms 16, 20, will be driven to $17^f$. The displacement $17^e$, $17^f$, undergone by this image is therefore equal to the diminution undergone by the cosine of the angle α when passing from the value zero to the value α.

From the above it will be seen that by rotating the prisms of the micrometer in opposite directions and through the same angle just described, it is possible to displace the image $14^e$ (Fig. 9) until it is reconstructed as shown at Fig. 8. It is also evident that from the angle of rotation α made by each of the prisms 16, 20, during this operation it will be possible to calculate the distance of the observed object when the base of the telemeter, the refracting angles of prisms 16, 20, the refraction index of the substances of which they are composed and their distance from the focal plane are known. In practice of course instead of this complicated calculation for deducting the distance, scales giving directly the distance corresponding to the rotation undergone by the prisms 16, 20, are employed.

One of the numerous constructional practical forms that the micrometer or measuring device may assume is shown in horizontal section and in elevation partly in section in Figs. 16 and 17 respectively. The prisms 16, 20, which are preferably achromatic, are mounted on two drums 22, 23, mounted, capable of rotating in supports 24, 25, connected with a base plate 26. In order to rotate the drums 22, 23 in opposite directions the same amount, we may employ any suitable arrangement for instance that represented in the drawing, in which a pinion 27 rotatably mounted in a projection made of two pieces 26$^a$, 26$^b$, of the base plate 26 and provided with an externally operable knob 28, engages with two toothed wheels 29, 30, mounted capable of rotating inside the pieces 26$^a$, 26$^b$, each connected with conical pinions 31 and 32 respectively engaging with toothed conical rings 33, 34, respectively provided at the side of the drums. Each drum is provided at a suitable place, for instance on its external surface, with a scale having an angular amplitude equal to the maximum angle of rotation to which each of the prisms 16, 20, may be subjected. This angle, as practice has shown, may be about 100°. Figs. 18 to 21 show said scales developed and in different positions. From said figures it appears that corresponding to the ends of the scales of the drum 23, there is an index for instance with number 12 on one of them; the other scale commencing with the same figure 12 carries at its beginning another index. The scales are viewed through a slot 35 (shown in dotted lines in Figs. 18 to 21) in the base plate 26; said slot having an angular width a little greater than one half of the angular extent of each scale. When the two drums are displaced as at Fig. 19, it is the index of the drum 22 (the only one that may be seen through the slot 35) that will serve to indicate the reading (in Fig. 19, one reads 8). When the two drums have performed a rotation corresponding to one half of the maximum rotation, the two indexes will be opposite as at Fig. 20. If the drums are further rotated, the index of drum 23 will leave the scale and then the reading will be effected by means of the index of the drum 23 (in Fig. 21 one will read 16).

It will be noted that in the practice it is preferable to obtain directly from the reading of the scales the distance of the object observed. For this reason the scales are not numbered as shown in Figs. 18 to 21, but in inverted order, namely they begin from the maximum end to the minimum. Generally in practice it is required to measure the distance of an object between 1000 and 6000 meters. Said limits being given by way of example, we will now describe how the gaging of the instrument is effected. The prisms 16, 20, are arranged as shown at Fig. 14 and we point at an object which is at the maximum distance for which the telemeter is intended, that is 6000 meters. Then by rotating one or the other or both of the prisms 16, 20, on their refracting edge (Fig. 1) the broken image of this object (Fig. 9) will be reconstructed into a single image as represented at Fig. 8. We mark then at the beginning of the drum scale 23, 60 hectometer (Figs. 22, 26). By observing then successively objects at lesser distances, the prisms 16, 20, must be rotated for the purpose of reconstructing the broken images into a single image as at Fig. 8. We mark thus successively on the scale of 23 the numbers 59 58 etc., hectometers. When the drum 23 has been rotated through an angle corresponding to one half of the maximum angle, viz. 50°, the first portion of the scale 22 is brought back on the drum 22 in correspondence with the last portion of the scale 23, said portion of the scale 22 serving also as an index and in correspondence of which the figure corresponding to the last portion of scale 23, for instance 35 hectometers is marked. Then taking this last portion as index, the scale is continued on the drum 22. In this way we obtain nearly proportional scales. In fact it is evident that the distance between the images 13$^e$, 14$^e$, Fig. 9 when passing from 60 to 50 hectometers is much less than the distance between said images when passing for instance from 35 to 34 hectometers. On the other side as the displacement imparted to the image 14$^e$ owing to the rotation of the prisms of the micrometer is proportional to the diminution undergone by the cosine of the angle to which each prism has been rotated and as said diminution is very slow when said angle is included in the first 30° of arc and is very quick when the angle is near 90°, the graduations of the scales will be almost equal and the reading will be equally easy when the object is at 60 or at 30 hectometers.

It must now be noted that in practice it is not always possible to effect the observations on an object of considerable height as at Fig. 7. Very often only a point is to be observed; in such case (Fig. 23) if the luminous ray 36 coming from this point through the objective 8 strikes at 36$^a$ the incident face of the prism 11 and leaves at the point 36$^b$ of the emergent face of prism 12, the corresponding ray 37 coming from the same point through the objective 7 would strike at 37$^a$; now as this face is limited only to the lower part of the luminous conical bundle coming from the objective 7 it would not be possible to see in the upper part of the field of the ocular the image of this point. We insert therefore in the path of the rays coming from the objective 7 a prism 38 which deviates to 37$^b$ the ray 37, which then strikes at 37$^c$ the face of 10 and comes out at 37$^d$ from the emergent face of 12. In this way the image of the point observed may also be seen in the upper part of the ocular field. The measurement of the distance is in this case effected by causing the two images of the observed point to coincide with the vertical wire of the cross hairs. As it is to be preferred, when possible, to point at an object having a certain extent in height, the prism 38 is then taken off. In order to prevent the shortening that the focal distance of the objective 7 would then undergo, we insert at the place of the prism a glass 39 having parallel plane faces, which corrects this inconvenience. For this purpose the prism and the said glass are mounted at right angles on the same mounting 40 (Figs. 24, 25) on a shaft 41 parallel with the ocular axis, and capable of rotating on a sleeve 42 fixed to the base plate 26 and operated from the outside by means of a pin 43 by means of which either the prism 38 or the glass 39 may be placed in operative position.

It is evident that when the plane glass 39 is brought exactly perpendicular to the optical axis X—X, it will not cause any deformation of the images. If on the contrary the glass is slightly inclined in respect of said axis, it will produce a lengthening, in the vertical direction, of the image given by the objective 7; said lengthening may be very useful to facilitate the collimation of the object when its height is limited. In fact in this case instead of keeping the glass 39 exactly vertical, it is slightly inclined by turning the pin 43 until the desired effect is attained.

*Rectifying arrangement.*—Notwithstanding the peculiar form of the mounting, preferably of metal, of the optical pieces of the telemeter and its arrangement inside the casing 4, as above said, the changes of temperature are always dangerously felt especially when they produce a deflection of the telemeter body in a horizontal plane containing the axis X—X. The result is to produce a rotation of the prisms 5, 6, on an axis which is parallel with their refracting edges. The rectifying arrangement hereafter described serves to bring the prisms 5, 6, again into the position occupied by them during the graduation of the instrument. The rectifying arrangement (Fig. 28) consists substantially of two little rectangular prisms 44, 45, beveled (at 45°) at one of their extremities in order to produce two reflecting faces 44$^a$ 45$^a$ respectively. These two prisms are placed in a position invariable with respect to the system 10, 11, 12 and at the opposite sides of this latter, so that the faces 44$^a$, 45$^a$ are parallel to the hypotenuses of the prisms 10, 11 respectively and will be in that part of the conical bundle of rays coming from the objectives 7 and 8 respectively, not occupied by the free sides of the prisms 10 or 11.

On the bases of the prisms 44, 45 near the lower edge of one and the upper edge of the other are engraved scales 44$^b$, 45$^b$, (see Fig. 29 showing the whole of the prism system 10, 11, 12, 44, 45). Besides this the upper and the lower half of the incident faces of the prisms 5 and 6 respectively are silvered, as shown by the hatched part of Figs. 32 and 28. This will not produce any inconvenience in the sight of the images through the telescopic system already described, as the lower and upper parts of the incident face of the prisms 5 and 6 that coöperate with the prisms 10 and 11 respectively of the erecting system remain quite free. Let us now suppose that on the base of the prism 45, near its upper edge (Fig. 28) be marked for instance a point 46 and this face be lighted in any desired manner. The luminous ray 46$^a$ coming from this image and reflected at 46$^b$ on the face 45$^a$ travels below the optical axis X—X, in the direction 46$^c$ crosses the lens 8 deviating upward, is reflected at 46$^d$ on the hypotenuse of 6 and then at 46$^e$ on the silvered part 6, travels back, is again reflected at 46$^f$, crosses the lens 8 above the optical axis X—X and strikes at 46$^g$ the prism 11 to emerge finally at 46$^h$ on the prism 12. If the distance of the travel 46, 46$^h$ as far as the lens 8, is equal to the focal distance of 8, it is evident that in the lower part of the ocular field 9, owing to the luminous ray coming out at 46$^b$ from the face 12, the image of the point 46 will be seen. It follows that in the lower part of the ocular field the scale 45$^b$ engraved on the upper edge of the prism base 45 will be seen. For the same reason the scale 44$^b$ engraved on the lower edge of the prism base 44 (Figs. 33, 34) will be seen in the upper part of the ocular field.

In Figs. 30, 31, 32, showing a constructional form of the telemeter body, we have shown the objectives 7 and 8, their prisms 5 and 6 and the system of erecting prisms with the prisms 44 and 45, namely only the parts necessary for the explanation of the working of the rectifying arrangement. The lighting of the bases of prisms 44 and 45 is effected through suitable slots provided in the block 3 of the telemeter mounting, said slots being kept open only during the rectifying operation. When the graduation of the instrument is completed, by suitably regulating the position of prisms 5 and 6 by means of the screws 3$^b$ fixing their mountings to the flanges 2$^a$ of the end rings of the telemeter body, the lighting slots of prisms 44 and 45 are opened in order to observe in the ocular field the position of the images of the scales 44ᵇ, 45ᵇ. If this position is the one represented at Fig. 33, it is in said position that said images must be during the measurement operation. If before effecting the measurement it is found that the images of the scales are displaced for instance as at Fig. 34, it means that a flexure of the telemeter body has taken place in the horizontal plane containing the optical axis X—X. Said flexion must be annulled before effecting the measurement. For correcting this any suitable arrangement may be employed, for instance that shown in the drawing, consisting of a rigid bar 47 attached at its ends to the flanges 2ᵃ of the telemeter body. A screw 46 screwed to the central part 49 of 47 and mounted capable of rotating but not of sliding along its axis in a hole, suitably provided in the block 3, serves to produce small deflection in the telemeter body, by rotating the same in the one or in the other direction. It is therefore possible to eliminate the deflection due to a change of temperature, this being effected by actuating the screw 48 until the images of the scales 44ᵇ 45ᵇ are brought again into the position shown in Fig. 33 or in register.

Of course the rectifying arrangement above described may be modified in many ways without departing from this present invention. Thus for instance the prisms 44 and 45, in order to realize the condition that their scales 44ᵇ and 45ᵇ be at a distance from the lenses 7 and 8, equal to the focal distance, by keeping the size of said prisms within reasonable limits, may have a double or triple reflection. In the same manner the arrangement for effecting a deflection of the telemeter body may be of any other suitable form.

We claim:

1. A telemeter having a central body portion, frames extending longitudinally therefrom, light receivers rigidly secured at the free ends of the frames, a bar connected to the ends of the frames and means coöperating with bar and body portion to flex the frames.

2. A telemeter having a central body portion, frames extending laterally therefrom, light receivers connected to the ends of the frames and means to flex the frames to correct the telemeter for temperature changes.

3. A telemeter having a central body portion, frames extending laterally therefrom comprising flanged bars, and light receivers mounted on the extremities of the flanged bars.

4. A telemeter having a central body portion and frames extending laterally therefrom comprising bars tapering toward their extremities and light receivers mounted on said extremities.

5. A telemeter having a central body portion and frames extending laterally therefrom each comprising bars and rings uniting the bars.

6. A telemeter having a central body portion and frames extending longitudinally therefrom each comprising a plurality of flanged bars tapering toward their outer ends and light receivers secured to said ends.

7. A telemeter having a central body portion and frames extending longitudinally therefrom and increasing in flexibility toward their outer ends, a bar connecting the outer ends and a screw coöperating with the bar and body portion to flex the frames.

8. A telemeter having a central body portion, frames extending therefrom, light receivers at the extremities of the frames, a prism system in the body to reconstruct the image from the partial images transmitted by the receivers and optical means at the optical axis of the telemeter to indicate and observe the error due to temperature changes and means to flex the frames to correct said error.

9. A telemeter having a central body portion, frames extending therefrom, light receivers at the outer ends of the frames, a prism system to reconstruct the image from the partial images transmitted by the receivers, a total reflecting prism on each side of said prism system, each having graduations thereon, and means to permit illumination of said prisms independently of the light receivers and means to flex the frames.

10. A telemeter having a body portion, frames extending therefrom, light receivers at the outer ends thereof, a portion of whose incident faces are formed as reflectors, an image reconstructing prism system in the body portion, a total reflecting prism having graduations thereon, on each side of the prism system at opposite sides of the optical axis, means to temporarily permit illumination of said prisms independently of the light receivers, and means to adjust the receivers relatively to the prisms to cause the images of the graduations to come into zero register.

11. A fixed base telemeter having light receivers, a prism system to reconstruct a full image from partial images from the receivers, an ocular coöperating with said system, and a plate between the ocular and system lying in a plane between the two portions of the reconstructed image.

12. In a telemeter, a prism system comprising a large total reflecting prism and two smaller total reflecting prisms both mounted adjacent to one another on a portion of the hypotenuse of the large prism.

13. In a telemeter, a prism system comprising a large total reflecting prism and two smaller crossed total reflecting prisms both mounted on and covering one half of the hypotenuse of the large prism.

14. In a telemeter, a prism system comprising a large total reflecting prism, two juxtaposed smaller crossed total reflecting prisms both covering and secured to one half of the hypotenuse of the larger prism, said hypotenuse being parallel to the optical axis and the optical axis passing between the juxtaposed faces of the small prisms.

15. In a telemeter the combination with a frame, light receivers at the ends thereof, a prism system between the light receivers, a pair of oppositely positioned oppositely rotatable distance indicating prisms between one of the receivers and said system, a prism and a plane glass rigidly mounted at right angles to one another and mounted to be turned through a right angle between the distance indicating prisms and said system.

In testimony that we claim the foregoing as our invention, we have signed our names in presence of two subscribing witnesses.

VIRGILIO COLZI.
FELICE BARDELLI.

Witnesses:
   FRANCENO SIMONI,
   TUDNO MARTINA.